United States Patent
Zhou et al.

(10) Patent No.: US 8,272,102 B2
(45) Date of Patent: Sep. 25, 2012

(54) ROTATING SHAFT FASTENER STRUCTURE

(75) Inventors: Cui-Yu Zhou, Shanghai (CN); Ming Wen, Shanghai (CN); Martin Hsu, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 65 days.

(21) Appl. No.: 12/785,616

(22) Filed: May 24, 2010

(65) Prior Publication Data

US 2011/0154611 A1 Jun. 30, 2011

(30) Foreign Application Priority Data

Dec. 24, 2009 (TW) .............................. 98224226 U

(51) Int. Cl.
*E05F 1/08* (2006.01)

(52) U.S. Cl. .......................................... 16/307; 16/256

(58) Field of Classification Search ............ 16/307, 16/254, 256, 250–251, 297, 303, 330; 361/679.27; 379/433.13; 455/575.3
See application file for complete search history.

(56) References Cited

U.S. PATENT DOCUMENTS

| | | | | |
|---|---|---|---|---|
| 5,628,089 A * | 5/1997 | Wilcox et al. | ............... | 16/303 |
| 5,996,178 A * | 12/1999 | Murray | ............... | 16/303 |
| 6,745,436 B2 * | 6/2004 | Kim | ............... | 16/330 |
| 6,917,824 B2 * | 7/2005 | Kobayashi | ............... | 455/575.3 |
| 7,111,773 B1 * | 9/2006 | So et al. | ............... | 235/1 D |
| 7,140,073 B2 * | 11/2006 | Park et al. | ............... | 16/348 |
| 7,150,072 B2 * | 12/2006 | Huang et al. | ............... | 16/312 |
| 7,155,780 B2 * | 1/2007 | Chen | ............... | 16/326 |
| 7,168,133 B2 * | 1/2007 | Luo et al. | ............... | 16/303 |
| 7,171,247 B2 * | 1/2007 | Han | ............... | 455/575.3 |
| 7,433,467 B2 * | 10/2008 | Yi | ............... | 379/433.13 |

* cited by examiner

*Primary Examiner* — William L. Miller
(74) *Attorney, Agent, or Firm* — Harness, Dickey & Pierce, PLC

(57) ABSTRACT

A fixing structure is provided. The fixing structure comprises a first housing, a rotating shaft, a second housing and a third housing. The first housing has an accommodating portion, and the rotating shaft is disposed in the accommodating portion. The second housing is disposed on one side of the rotating shaft. The third housing is disposed on the other side of the rotating shaft and covers the rotating shaft and the second housing. The shaft body is wedged into a shaft bore, and the shaft shoulder is wedged into the second housing. The third housing is against one side of the shaft body, and covers the rotating shaft and the second housing. The shaft shoulder is firmly against the second housing. Thus, it does not need any tool to assemble and disassemble.

8 Claims, 7 Drawing Sheets

ROTATING SHAFT FASTENER STRUCTURE

FIELD

The present invention relates to a fixing structure; particularly, the present invention relates to a rotating shaft fastener structure in which the shaft body can be conveniently assembled or dissembled in the housing without any need for other specific assembly tools.

BACKGROUND

The fixing structure is a structure now comprehensively applied in various electronic products, which enables rotations of the housing by means of the assembly of the shaft body and the housing.

Refer to FIG. 1, wherein a diagram of planar view for a prior art rotating shaft profile is shown. In the figure, the rotating shaft comprises a shaft body 10, a shaft shoulder 11 and an internal spring 12.

Refer next to FIG. 2, wherein a diagram of a prior art rotating shaft structure is shown. In the figure, it shows that most of current rotating shaft fastener structures belong to a type of two-housing assembled rotating shaft fastener structure, e.g., by a first housing 20 and a second housing 21. In the first housing 20 there installs a groove 200 profiled to be able to match the shaft body. In assembly, one end of the shaft body 10 is first inserted into the groove 200, and then the second housing 21 is placed therein to fasten the shaft body 10; however, during assembly, it is required to press down the shaft shoulder 11 in closure, and since the shaft shoulder 11 is actually the other end of the shaft body 10, the shaft shoulder 11 retracts due to the compressive force from the internal spring 12 of the shaft body 10, thus the shaft shoulder 11 is pressed in retraction; in conjunction with specific assembly tools, the shaft shoulder 11 can be partially fitted into the second housing 21, and the tool is then removed thereby allowing the shaft shoulder 11 to be restored in position by means of the elastic force exerted by the internal spring of the shaft body 10 so as to be assembled between the first housing 20 and the second housing 21.

Such a fastener structure requires assistances of the specific assembly tool during machine assembly and disassembly processes, and it has to use force to press down the shaft shoulder in closure and then have it disposed with the other housing. As a result, in the assembly and disassembly process, due to such an assembly approach for the shaft shoulder and the housing through application of force, the shaft shoulder may potentially hit the housing thus causing damages to the housing; or alternatively, since it is not possible to affirmatively verify whether the assembly of the housing and the shaft shoulder is well accomplished in position, the restoration of the spring may not be complete, thus leading to poor positioning problem in the shaft body.

SUMMARY

In view of the aforementioned drawbacks found in prior art, the objective of the present invention is to provide a fixing structure in order to resolve the issue that it is at present necessary to use particular assembly tools to install the shaft body in the housing, and it is also possible to prevent the use of force to press down the shaft shoulder in closure for installation thereof into the housing as done in the current assembly and disassembly process, thereby eliminating the possibility of unnecessary damages and achieving the purpose of convenient assembly and disassembly for the shaft body as well.

According to the objective of the present invention, a fixing structure is herein provided, comprising a first housing, a rotating shaft, a second housing and a third housing, in which the first housing has an accommodating portion, the rotating shaft is disposed in the accommodating portion, and the rotating shaft consists of a shaft body and a shaft shoulder, which shaft shoulder being pivotally connected to one side of the shaft body; the second housing is disposed on one side of the rotating shaft, and the second housing is at least partially received in the accommodating portion and connected with the shaft shoulder, and the third housing is disposed on the other side of the rotating shaft and extends to cover the rotating shaft and the second housing.

Herein, a plurality of positioning elements are disposed on the shaft body.

Herein, a block structure is disposed on the first housing, in which the block structure is disposed with a shaft bore, the shaft bore pierces with a plurality of positioning holes, and the shaft body is wedged into the shaft bore by means of the plurality of positioning elements.

Herein, the second housing includes a groove and the shaft shoulder of the rotating shaft is wedged into the groove.

Herein, an elastic component is disposed inside the shaft body, a prop end is disposed outside the shaft body, and one side of the prop end leans against the elastic component.

Herein, the third housing includes a protrusion, and the protrusion is wedged into the first housing and leans against the prop end of the shaft body.

In summary, the fixing structure according to the present invention provides one or more of the following advantages:

(1) the fixing structure according to the present invention can be completely assembled without any additionally tools, nor by exertion of any external force; and (2) the fixing structure according to the present invention can be completely disassembled without any additionally tools.

DRAWINGS

DETAILED DESCRIPTION

Hereunder references will be made to appended drawings for describing the embodiments of the fixing structure according to the present invention. To facilitate better appreciation, the same components illustrated in the following embodiments are denoted with the identical reference numbers.

Figure 1:
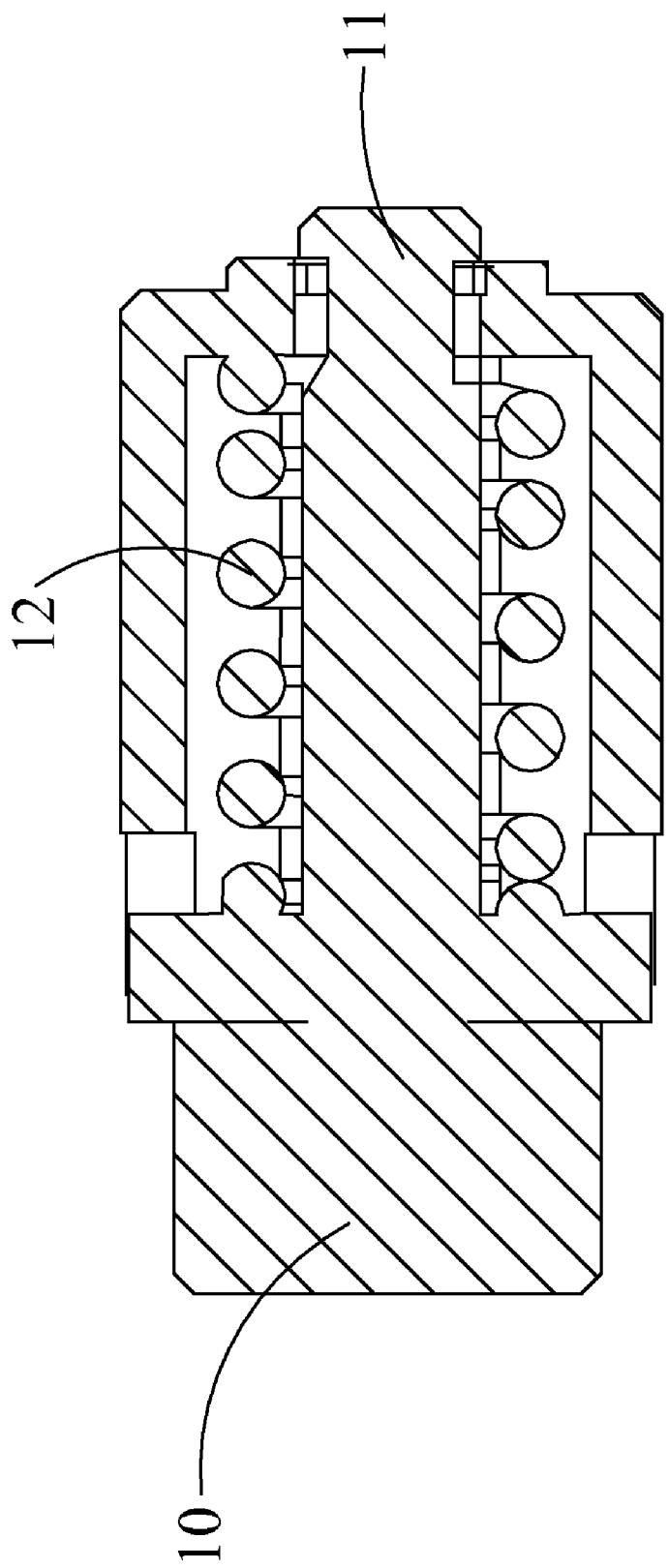
FIG. 1 is a diagram of planar view for a prior art rotating shaft profile.
Figure 2:
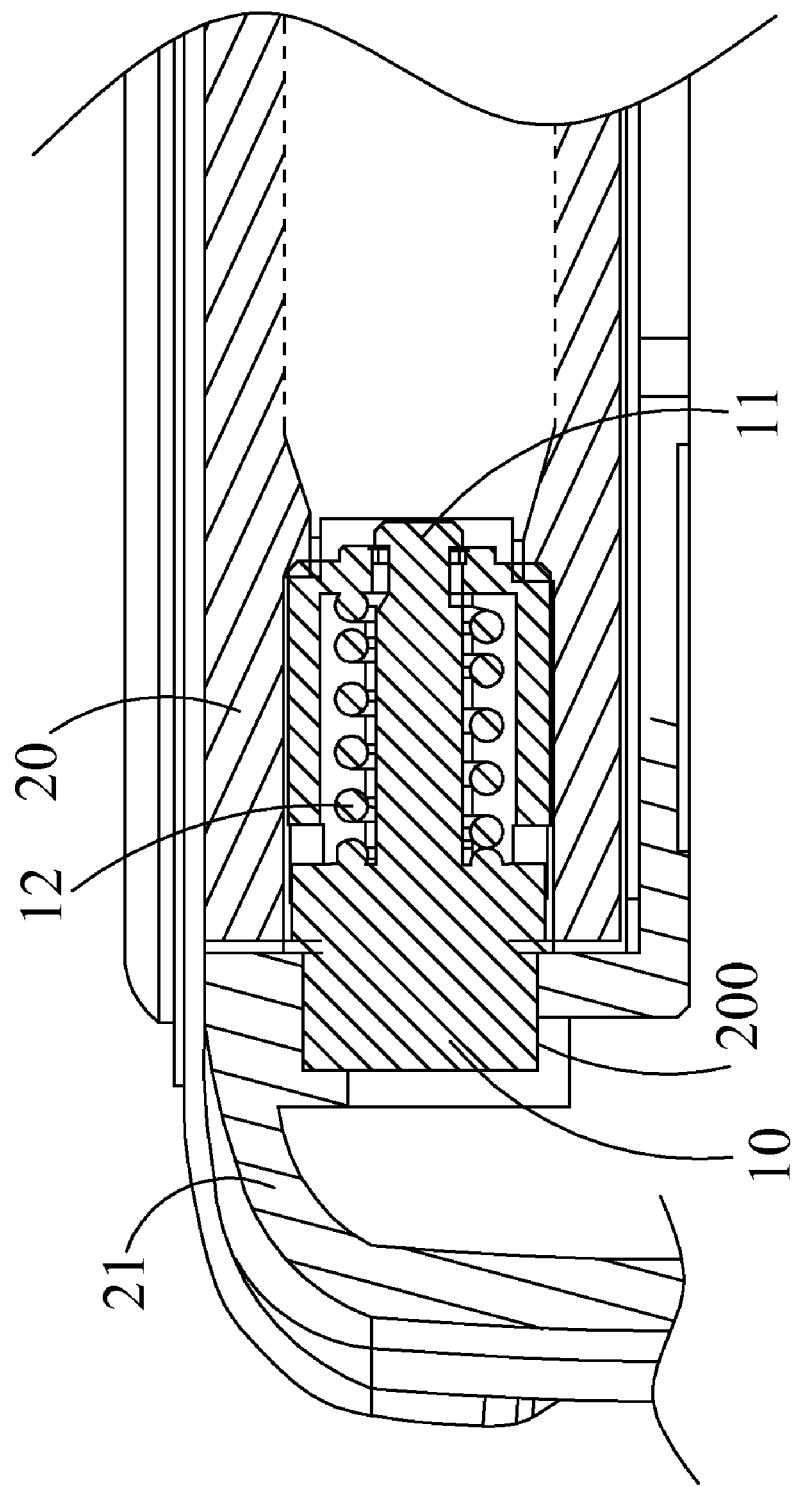
FIG. 2 is a diagram of a prior art rotating shaft structure.
Figure 3:
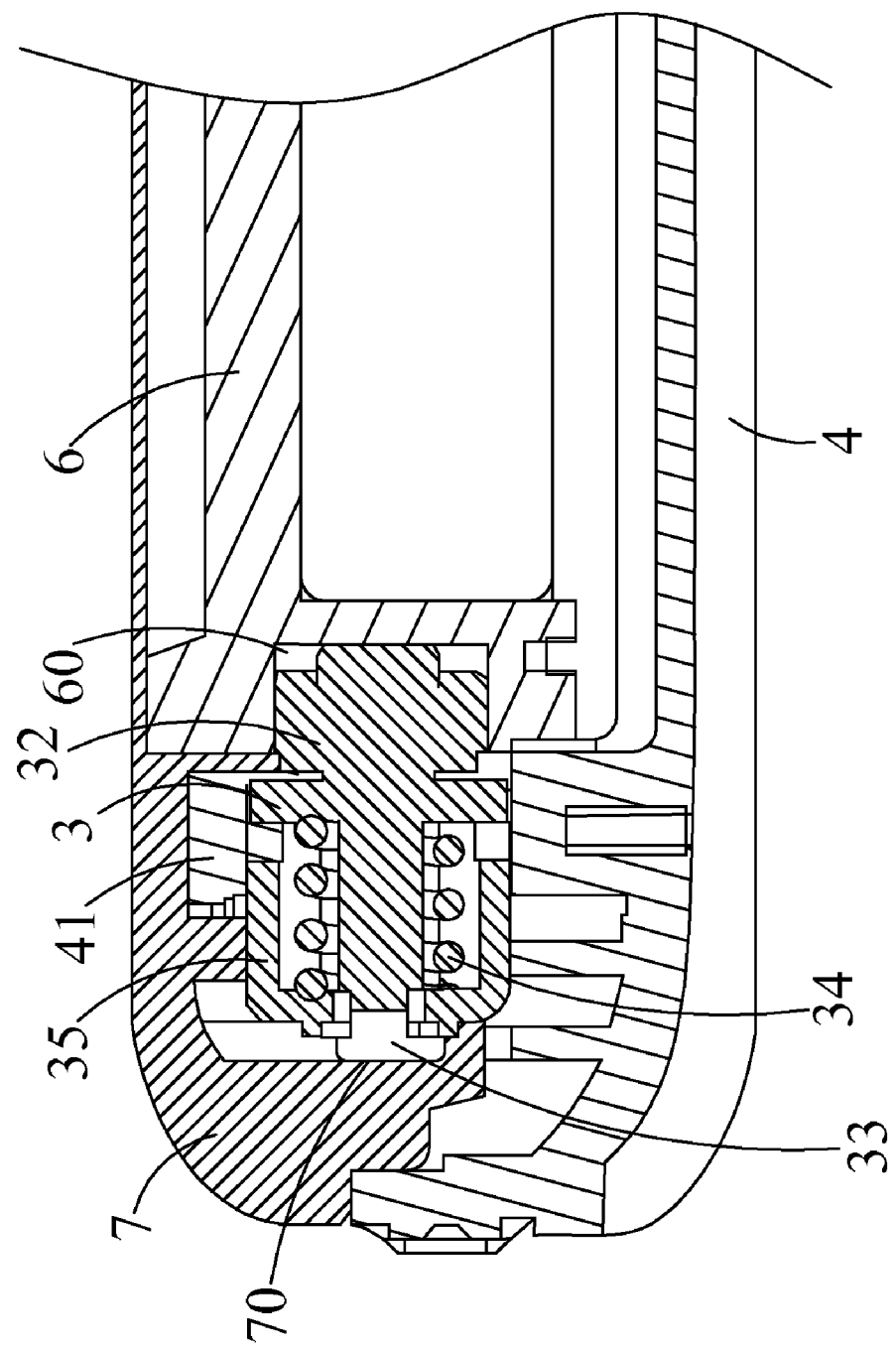
FIG. 3 is a cross-sectional view of the integral architecture for an embodiment of the fixing structure according to the present invention.

Refer now to FIG. 3, wherein a cross-sectional view of the integral architecture for an embodiment of the fixing structure according to the present invention is shown. In the figure, the fixing structure comprises a rotating shaft 3, a first housing 4, a second housing 6 and a third housing 7. As shown in the figure, the rotating shaft 3 is disposed on the first housing 4, one side of the rotating shaft 3 is connected with one end of the second housing 6, while the other side of the rotating shaft 3 is connected with the third housing 7, and the third housing 7 extends to cover the rotating shaft 3, the first housing 4 and the second housing 6; such a rotating shaft fastener structure can provide convenient assembly and disassembly processes whose detailed steps are now described as below in accordance with the appended drawings.

Figure 4:
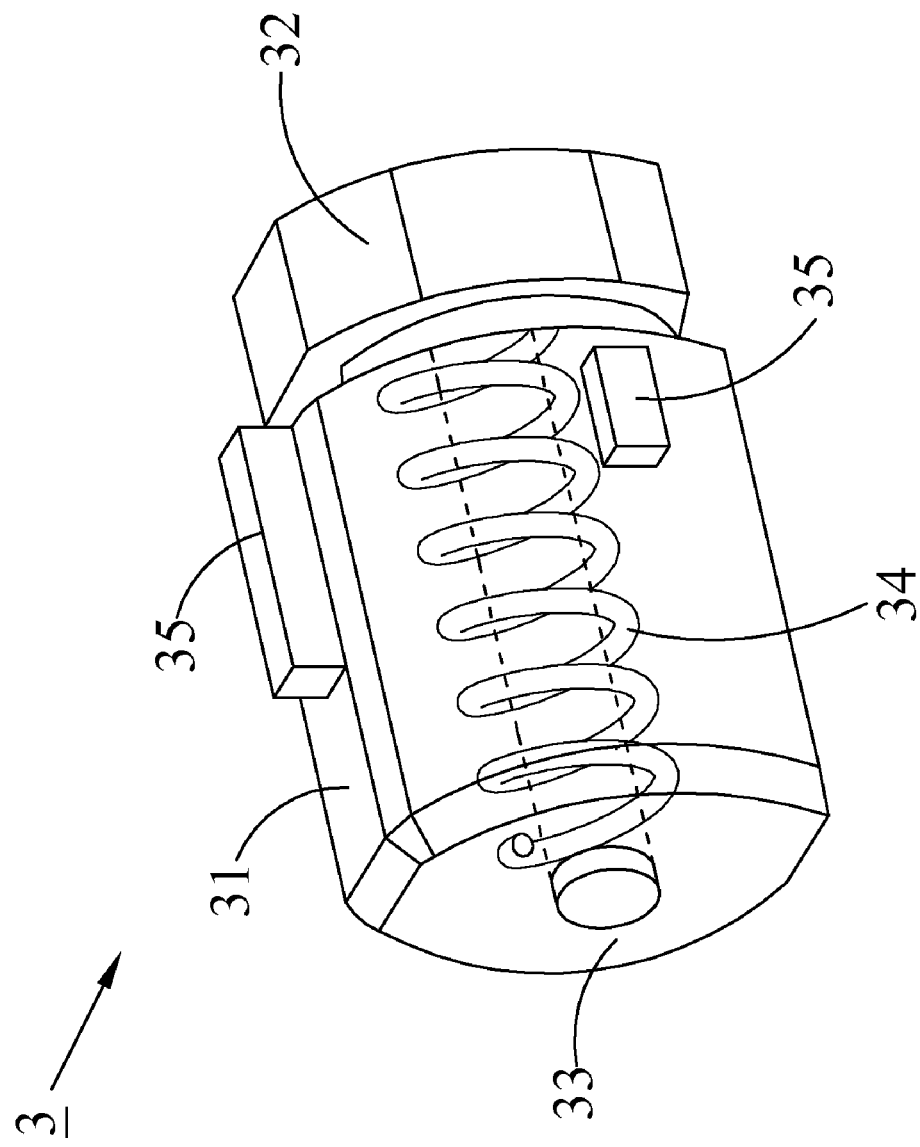
FIG. 4 is a diagram of the architecture for a rotating shaft according to the present invention.

Refer next to FIG. 4, wherein a diagram of the architecture for a rotating shaft according to the present invention is shown. In the figure, the rotating shaft 3 includes a shaft body 31, a shaft shoulder 32, a prop end 33, an elastic component 34 and a plurality of positioning elements 35. In the present embodiment, the number of the plurality of positioning elements 35 is two, the shaft shoulder 32 is pivotally connected to the shaft body 33 and can rotate relatively in terms of the shaft body, the prop end 33 leans against the elastic component 34, the elastic component 34 is located inside the shaft body 31 and provides the prop end 33 with a force toward outside.

Figure 5:
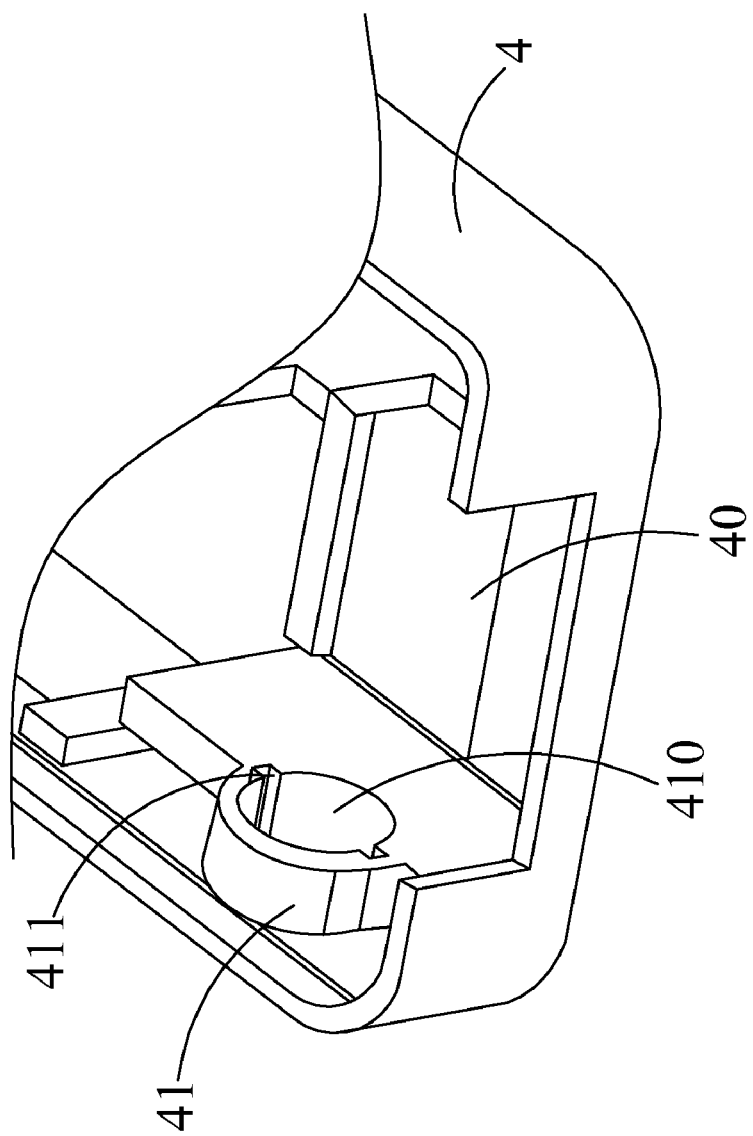
FIG. 5 is a diagram of the architecture for the first housing according to the present invention.

Refer now to FIG. 5, wherein a diagram of the architecture for the first housing according to the present invention is shown. In the figure, the first housing 4 includes an accommodating portion 40 and a block structure 41 which is located on the accommodating portion 40 of the first housing 4, with a shaft bore 410 and a plurality of positioning holes 411 being disposed on the block structure 41. In the present embodiment, the number of the plurality of positioning holes 411 is two. Refer back to FIG. 4, it can be seen that the accommodating portion 40 provides the rotating shaft 3 with a space for placement, and the shaft body 31 is tabled with the positioning hole 411 on the shaft bore 410 through the positioning element 35.

Figure 6:
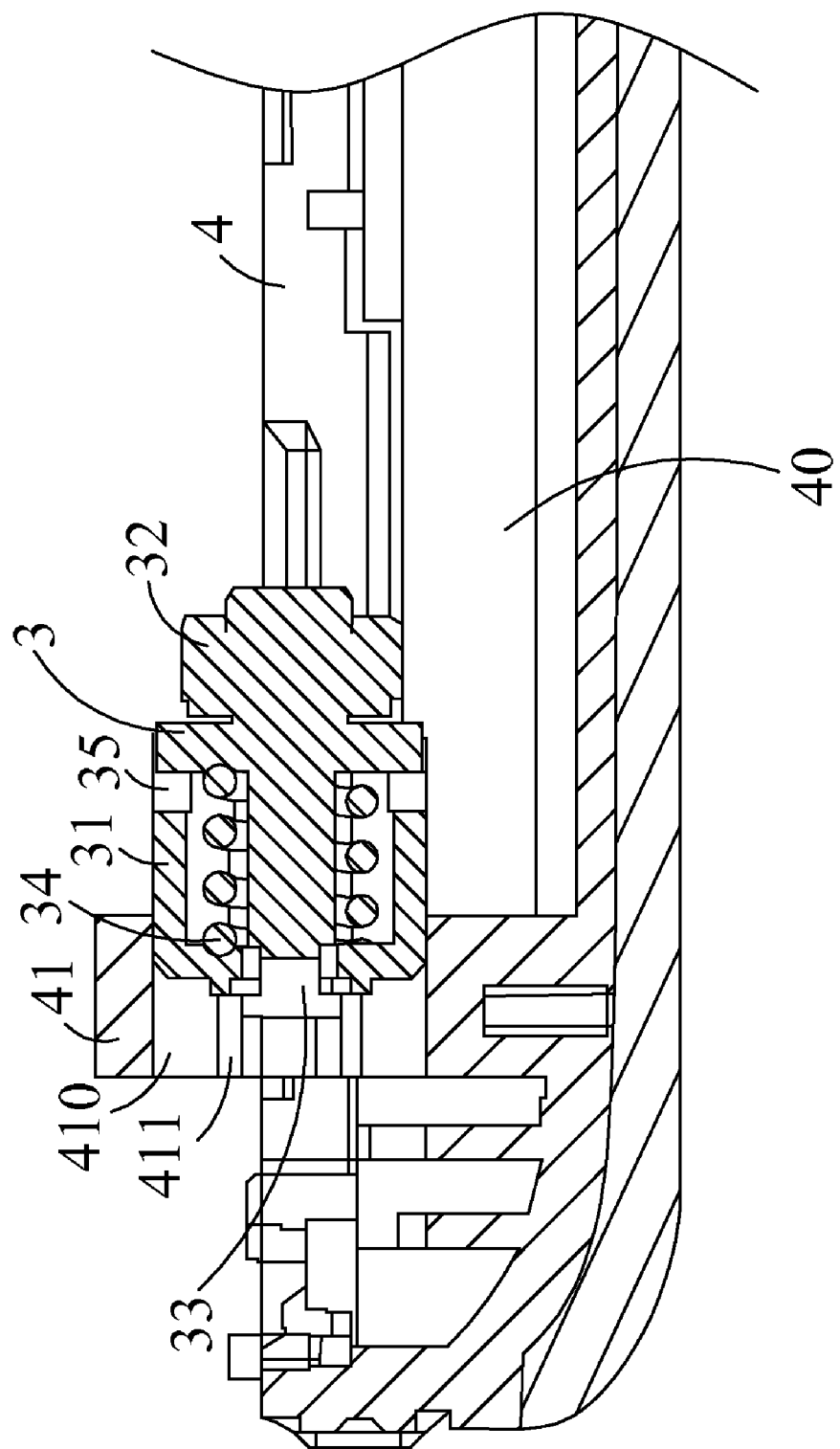
FIG. 6 is a cross-sectional view of the architecture for connection of the first housing and the rotating shaft according to the present invention.

Refer to FIG. 6, wherein a cross-sectional view of the architecture for connection of the first housing and the rotating shaft according to the present invention is shown. In the figure, the rotating shaft 3 and the first housing 4 are connected together, which is also the first step for the assembly of the rotating shaft structure. The rotating shaft 3 is wedged into the shaft bore 410 on the block structure 41 of the first housing 4, the positioning element 35 of the rotating shaft 3 is wedged into the positioning hole 411 on the block structure 410, and the number of positioning elements 35 corresponds to the number of positioning holes 411.

Figure 7:
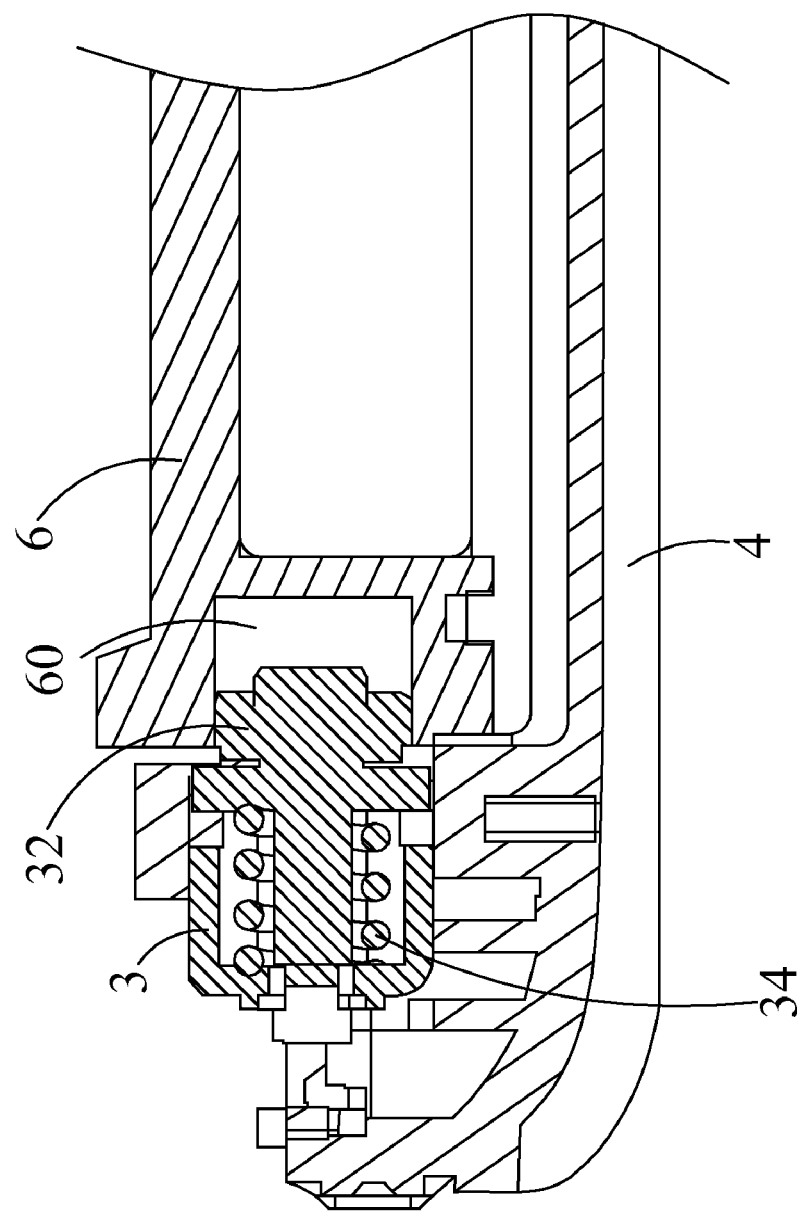
FIG. 7 is a cross-sectional view of the architecture for connection of the second housing and the rotating shaft according to the present invention.

Then refer to FIG. 7, wherein a cross-sectional view of the architecture for connection of the second housing and the rotating shaft according to the present invention is shown. In the figure, the first housing 4 and the rotating shaft 3 have been connected together. Next, the second housing 6 is wedged into the shaft shoulder 32 on the rotating shaft 3, which is also the second step for the assembly of the rotating shaft structure. The second housing 6 is wedged into one side of the first housing 4, and the second housing 6 has a groove 60 which provides the shaft shoulder 32 with a space for connection. The shape of the groove 60 matches the shaft shoulder 32, but in the present embodiment, the shaft shoulder 32 is not connected in closure with the groove 60.

Referring again to FIG. 3, the first housing 4 and the rotating shaft 3 have been connected together, the second housing 6 is wedged into the shaft shoulder 32 on the rotating shaft 3 and the second housing 6 is located on one side of the first housing 4. Then, the third housing 7 is disposed on the other side of the first housing 4, which is also the third step for the assembly of the rotating shaft structure. The third housing 7 has a protrusion 70 which is connected with one side of the first housing 4 in proximity to the shaft body 32 and leans against the prop end 33 of the rotating shaft 3; in this way the prop end 33 is allowed to exert a force onto the shaft shoulder 33 through the internal elastic component 34 such that the shaft shoulder 32 can be firmly connected with the groove 60. As such, since the shaft shoulder 32 is pivotally connected with the shaft body 32, the shaft shoulder 32 is able to rotate relatively in terms of the shaft body 31, allowing the shaft shoulder 32 to further drive the second housing 6 to rotate relatively in terms of the shaft body 32; at this moment, the assembly for the fixing structure according to the present invention is completed.

To disassemble the rotating shaft fastener structure, initially, it needs only to uninstall the third housing 7; thus, the force coming from the protrusion 70 and applied onto the prop end 33 is removed, so the shaft shoulder 32 is allowed to be taken away from the groove 60; the second housing 6 can be then moved out when it is not subject to the force imposed by the shaft shoulder 32. After removal of the second housing 6, the rotating shaft 3 can be checked out of the shaft bore 410 on the block structure 41, accordingly accomplishing the disassembly of the structure.

In summary of the above-illustrated descriptions, the shaft body of the rotating shaft fastener structure according to the present invention can be conveniently assembled and disassembled in the housing without any specific assembly tools, nor requirements of force for pressing down the shaft shoulder in closure.

The aforementioned texts are simply exemplary, rather than being limiting. All effectively equivalent modifications or substitutions without departing from the spirit and scope of the present invention are deemed to be included in the claims set forth hereunder.

What is claimed is:

1. A fixing structure, comprising:
a first housing having an accommodating portion;
a rotating shaft disposed in the accommodating portion and comprising:
  a shaft body; and
  a shaft shoulder pivotally connected to one side of the shaft body;
a second housing disposed on one side of the rotating shaft, and the second housing being at least partially received in the accommodating portion and connected with the shaft shoulder; and
a third housing disposed on the other side of the rotating shaft and covering the rotating shaft and the second housing;
wherein the first housing comprises a block structure disposed thereon and having a shaft bore and a plurality of positioning holes, the shaft bore pierces through the block structure, the positioning holes are disposed on the shaft bore, and the shaft body is wedged into the shaft bore.

2. The fixing structure according to claim 1, wherein the rotating shaft further comprises a plurality of positioning elements disposed on the shaft body.

3. The fixing structure according to claim 1, wherein the second housing has a groove and the shaft shoulder is wedged into the groove.

4. The fixing structure according to claim 1, wherein the rotating shaft further comprises an elastic component disposed inside the shaft body, a prop end is disposed outside the shaft body, and one side of the prop end leans against the elastic component.

5. The fixing structure according to claim 4, wherein the third housing comprises a protrusion and the protrusion is wedged into the first housing and leans against the other side of the prop end.

6. A fixing structure, comprising:

a first housing having an accommodating portion;

a rotating shaft disposed in the accommodating portion and comprising:

a shaft body; and a shaft shoulder pivotally connected to one side of the shaft body;

a second housing disposed on one side of the rotating shaft, and the second housing being at least partially received in the accommodating portion and connected with the shaft shoulder; and a third housing disposed on the other side of the rotating shaft and covering the rotating shaft and the second housing;

wherein the rotating shaft further comprises an elastic component disposed inside the shaft body, a prop end is disposed outside the shaft body, and one side of the prop end leans against the elastic component;

wherein the third housing comprises a protrusion and the protrusion is wedged into the first housing and leans against the other side of the prop end.

7. The fixing structure according to claim 6, wherein the rotating shaft further comprises a plurality of positioning elements disposed on the shaft body.

8. The fixing structure according to claim 6, wherein the second housing has a groove and the shaft shoulder is wedged into the groove.

* * * * *